(12) United States Patent
Sperber et al.

(10) Patent No.: US 7,503,431 B2
(45) Date of Patent: Mar. 17, 2009

(54) MECHANICAL ROTATIONAL DRIVE

(75) Inventors: Franz Sperber, Kolbermoor (DE);
Walter Stich, Miesbach (DE);
Leonhard Stielner, Weyam (DE);
Adalbert Wagner, Radthal-Woensmuehl (DE)

(73) Assignee: Eads Space Transportation GmbH, Bremen (DE)

( * ) Notice: Subject to any disclaimer, the term of this patent is extended or adjusted under 35 U.S.C. 154(b) by 320 days.

(21) Appl. No.: 11/429,943

(22) Filed: May 9, 2006

(65) Prior Publication Data

US 2006/0276248 A1 Dec. 7, 2006

(30) Foreign Application Priority Data

May 10, 2005 (DE) .................. 10 2005 021 459

(51) Int. Cl.
*F03G 1/00* (2006.01)
(52) U.S. Cl. .................. 185/45; 244/172.6; 464/97
(58) Field of Classification Search .................. 464/86, 464/97; 16/75; 242/379.1, 381; 244/172.6, 244/172.7; 185/37, 45; 267/154
See application file for complete search history.

(56) References Cited

U.S. PATENT DOCUMENTS

| | | | | |
|---|---|---|---|---|
| 810,412 | A * | 1/1906 | Hobbs | 464/86 X |
| 1,640,670 | A * | 8/1927 | Schaeffer | 464/86 |
| 2,209,553 | A * | 7/1940 | Bannenberg | 16/75 X |
| 3,424,403 | A * | 1/1969 | Hull | 244/172.6 X |
| 4,479,356 | A | 10/1984 | Gill | |
| 5,086,541 | A | 2/1992 | Auternaud et al. | |
| 5,785,280 | A | 7/1998 | Baghdasarian | |
| 6,062,511 | A | 5/2000 | Cussac | |
| 6,298,662 | B1 | 10/2001 | Vezain et al. | |
| 2002/0000496 | A1 | 1/2002 | Roth et al. | |

FOREIGN PATENT DOCUMENTS

| | | |
|---|---|---|
| DE | 37 40 756 A1 | 6/1989 |
| DE | 689 02 110 T2 | 3/1993 |
| DE | 44 03 465 C1 | 7/1995 |
| DE | 696 04 165 T2 | 2/2000 |
| DE | 696 08 930 T2 | 1/2001 |
| FR | 964 473 A | 8/1950 |
| GB | 963 860 A | 7/1964 |

\* cited by examiner

*Primary Examiner*—Greg Binda
(74) *Attorney, Agent, or Firm*—Greenblum & Bernstein, P.L.C.

(57) ABSTRACT

A mechanical rotational drive has a bar-like torsion element, whereby the torsion element is firmly clamped with a first end in a bearing device. The torsion element can be pivoted with a second free end with respect to the clamped end about the longitudinal axis, forming a rotation axis, of the torsion element between a relaxed position and a tensioned position, whereby the length of the torsion element is reduced with respect to the relaxed position when the torsion element is brought into its tensioned position. A device for transmitting a torque into the torsion element or out of the torsion element is provided in the area of the free end, and a damping device is arranged in the axial direction of the torsion element at a fixed distance from the bearing device and adjacent to the free end of the torsion element, and a damping part is provided on the torsion element in the area of the free end of the torsion element, which damping part in the relaxed position is in friction engagement with the damping device and which in the tensioned position is not engaged with the damping device.

12 Claims, 4 Drawing Sheets

MECHANICAL ROTATIONAL DRIVE

CROSS-REFERENCE TO RELATED APPLICATION

This application claims priority under 35 U.S.C. §119 of German Patent Application No. 10 2005 021 459.2, filed on May 10, 2005, the disclosure of which is hereby incorporated by reference thereto in its entirety.

BACKGROUND OF THE INVENTION

1. Field of the Invention

The present invention relates to a mechanical rotational drive with a bar-like torsion element.

2. Discussion of Background Information

A variety of mechanical rotational drives are known. In particular, such drives are used in space engineering in order, e.g., to effect one-time actuations of external structures on satellites, e.g., the extension of antennas or solar panels. Such rotational drives have the advantage that they can be preloaded with a mechanical energy on earth before the start of a space mission, which energy is then emitted in space to perform the desired actuation. This actuation is therefore not dependent on the very limited electric energy available in space.

However, with satellites or other spacecraft such drive solutions call for a high degree of reliability and a great position accuracy of the extended antenna or the extended solar panel after extension. In order to achieve this aim, conventional mechanical systems are complex in design, heavy and therefore expensive. A serious problem with conventional mechanical systems is the bearing clearance that as a rule does not guarantee an exact positioning of an external structure to be extended. To this end separate mechanical means, such as, e.g., engagement devices, are frequently necessary, the provision of which, however, in turn increases the weight and thus the expense and also the complexity of the overall arrangement, which regularly has a negative impact on the reliability of the overall system.

DE 37 40 756 A1 relates to a torsionally elastic hollow shaft for transmitting torque which, for damping torsional vibrations, is combined with an outer or inner torsion-resistant tubular body in a coaxial arrangement, with the occurrence of friction. The hollow shaft is thereby made of a fiber composite and is connected directly to connection parts for introducing the torque and takes on only the transmission of torque, whereas the torsion-resistant tubular body produces friction forces relative to the twisted shaft. The friction can be produced by surface contact or by internal friction in liquid or solid damping media.

DE 696 08 930 T2 relates to communication satellites, space stations, and the like which utilize solar panel arrays as a main source of power. The document describes a hybrid solar panel array that employs a combination of rigid solar panels with semi-rigid solar panels or with flexible solar panels.

DE 696 04 165 T2 relates to a device for positioning a solar panel on a spacecraft. The device comprises a heat-sensitive drive mechanism suitable for causing the panel to be displaced relative to the body of the spacecraft automatically as a function of the direction of incidence of the solar radiation on the spacecraft.

DE 689 02 110 T2 relates to an antifriction self-motorized joint and an articulated unit, e.g., a satellite solar panel, provided with such joints. The joint includes two braces suitable for rolling onto each other through two cylindrical surfaces.

SUMMARY OF THE INVENTION

The invention is directed to a mechanical rotational drive that has a small bearing clearance with a low weight and low degree of complexity and thus can achieve a high positioning accuracy and can be produced in a cost-effective manner with high degree of reliability.

These features of the invention are embodied in the mechanical rotational drive as disclosed and claimed herein.

A mechanical rotational drive, according to the invention, has a bar-like torsion element, whereby the torsion element is clamped with a first end in a bearing device and is rotationally movable about the longitudinal axis of the torsion element, forming a rotational axis, whereby a second free end of the torsion element rotates relative to the first clamped end between a relaxed position and a tensioned position of the torsion element. The length of the torsion element is reduced with respect to the relaxed position when the torsion element is brought into its tensioned position. A device for transmitting a torque into the torsion element or out of the torsion element is provided in the area of the free end. A damping device is arranged in the axial direction of the torsion element at a fixed distance from the bearing device and adjacent to the free end of the torsion element, and a damping part is provided on the torsion element in the area of the free end of the torsion element, which damping part in the relaxed position is in friction engagement with the damping device and which in the tensioned position is not engaged with the damping device.

The provision according to the invention of a damping device in the axial direction of the torsion element at a fixed distance from the bearing device and adjacent to the free end of the torsion element and the provision of the damping part in the area of the free end of the torsion element such that the damping part in the relaxed position of the torsion element is in friction engagement with the damping device and in the relaxed position of the torsion element is not engaged with the damping device, utilizes in a skillful, novel manner the effect that the torsion element is slightly lengthened in the relaxation in the axial direction so that with this lengthening of the torsion element the damping device and the damping part can become engaged with one another. The torsional movement of the torsion element from its tensioned position into the relaxed position is thus slowed down at the end or shortly before the end of the torsional path provided by the friction engagement between the damping part and the damping device so that it can reach its precise predetermined target position. This friction engagement also prevents the torsion element, while slowing down, from performing a torsional vibration around the target position, since the friction engagement damps a vibration of this type at the very start.

It is particularly advantageous if the torsion element has a central support bar that suppresses a bending of the torsion element along its longitudinal axis and thus increases the static stability of the torsion element.

It is also advantageous if the torsion element has elastic flexural bars arranged in an annular manner parallel to the longitudinal axis, which bars are clamped in an annular manner in the bearing device and in the device for transmitting a torque. This annular arrangement of flexural bars makes it possible to create a particularly light torsion element that, with a compact design, renders possible large torsion angles and an effective clear change of length over the torsional path.

It is thereby particularly advantageous if the flexural bars comprise a carbon fiber material, which further reduces the weight.

The flexural bars arranged in an annular manner are preferably enclosed by a tubular jacket, whereby a protection for the flexural bars is obtained.

The free end of the torsion element is preferably freely pivotable relative to the central support bar and/or to the tubular jacket.

A particularly advantageous embodiment of the mechanical rotational drive according to the invention is wherein the damping part has at least one friction surface that is rotatable around the rotation axis and that the damping device has at least one friction surface that is arranged at least in sections around the rotation axis. This concentric arrangement of damping part and damping device around the rotation axis makes it possible to build up the damping force slowly and continuously over a predetermined distance of a path of the rotational movement and thus obtain a particularly effective damping and slowing down of the torsion element, since the change of length of the torsion element increases the frictional force between damping part and damping device.

It is particularly advantageous thereby if the friction surfaces are embodied as radial surfaces with respect to the rotation axis.

It is even more effective if the friction surfaces are embodied as conical surfaces around the rotation axis, whereby they can be embodied in a tapered conical or spherically conical manner.

The friction surfaces can be embodied in an annular or partially annular manner.

According to the invention, particular embodiment of the invention is the use of a mechanical rotational drive according to the invention as a drive element for deploying external structures on spacecraft.

Other exemplary embodiments and advantages of the present invention may be ascertained by reviewing the present disclosure and the accompanying drawing.

BRIEF DESCRIPTION OF THE DRAWINGS

The invention is further described in the detailed description which follows, with reference to the attached drawings by way of non-limiting examples of exemplary embodiments of the invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
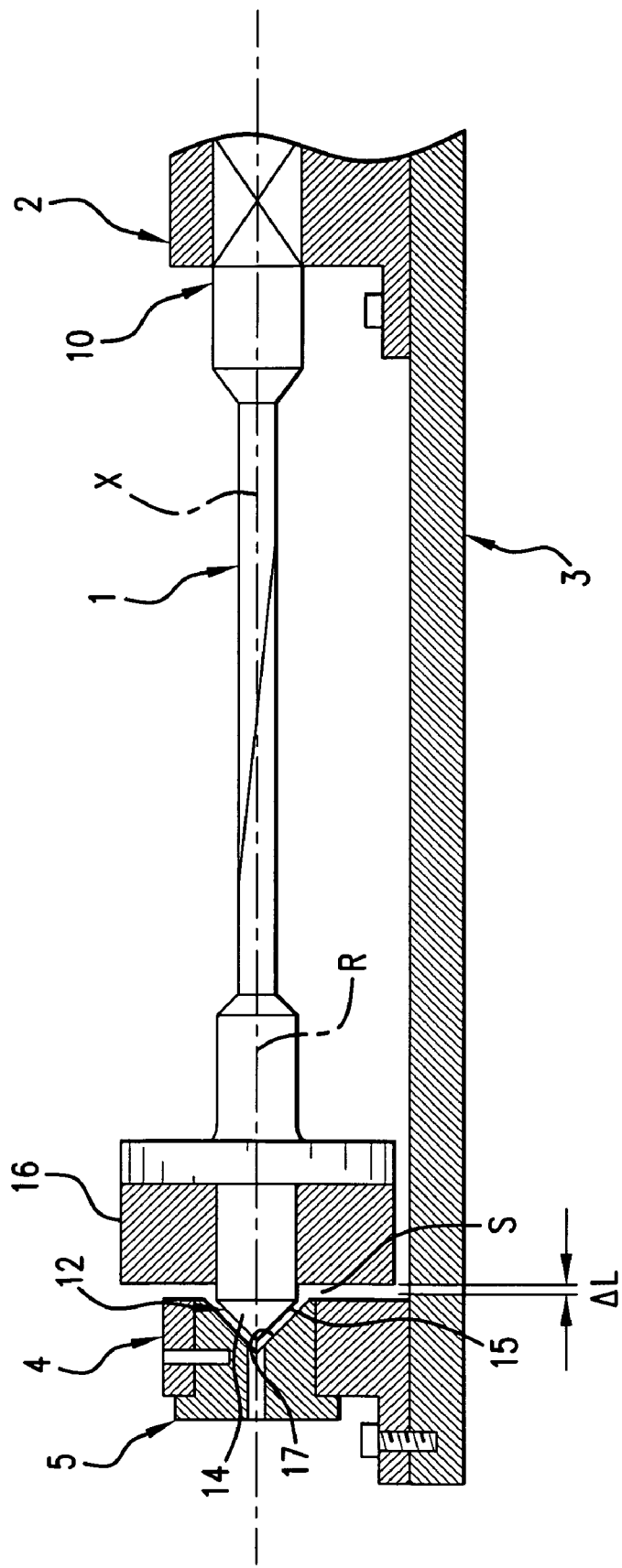
FIG. 1 is a schematic representation of a mechanical rotational drive in longitudinal section.

FIG. 1 shows in diagrammatic form a mechanical rotational drive according to the invention. A bar-like torsion element 1 is firmly clamped with a first end 10 in a bearing device 2. The bearing device 2 is firmly attached to a base 3. The base 3 can be, e.g., an outer structural element of a spacecraft, on which an external structure of the spacecraft, e.g., an antenna or a solar panel, is attached.

Furthermore, a counter-bearing device 4 is firmly attached to the base 3, which device has a damping device 5. The spacing in the axial direction of the torsion element 1 between the bearing device 2 and the damping device 5 is firmly determined by the relative positions of the bearing device 2 and the counter-bearing device 4 on the base 3.

On its second free end 12 facing away from the first end 10, the torsion element 1 is provided with a damping part 14 constructed for friction engagement with the damping device 5. Furthermore, a device 16 for transmitting a torque to the torsion element 1 or from of the torsion element 1 is provided in the area of the free end 12. The torque-transmitting device 16 can be, e.g., a lever extending radially with respect to the rotation axis R.

FIG. 1 shows the torsion element 1 in its position twisted with respect to the idle condition and thus tightened in the rotational direction. Through this twisting with respect to its idle condition, the length of the torsion element 1 is reduced by the amount $\Delta L$ with respect to its length in the idle condition.

While in its relaxed neutral position the torsion element 1 bears with the conical friction surface 15 embodied on the front on the damping part 14 against a conical opposing friction surface 17 of the damping device 5 embodied to fit thereto, in the tensioned position of the torsion element 1 a gap S is formed between the two conical friction surfaces 15 and 17 so that the friction surfaces 15, 17 are not engaged with one another in the tensioned position of the torsion element 1.

In the diagrammatic example shown in FIG. 1, the conical friction surface 15 on the free end 12 of the torsion element 1 is embodied as a conical vertex projecting in the direction of the damping device 5, while the opposing friction surface 17 provided on the damping device 5 forms a corresponding conical indentation in the damping device 5. Both the cone of the friction surface 15 and the cone of the opposing friction surface 17 are arranged coaxially relative to the rotational axis R and, thus, relative to the longitudinal axis X of the torsion element 1.

Although in the diagrammatic representation of FIG. 1 the torsion element 1 is shown as a torsion bar, this does not mean that the bar-like torsion element 1 necessarily has to be embodied as a torsion bar. It can equally well be embodied as a torsion tube or as an annular arrangement of a plurality of flexural or torsion bars as described in the following exemplary embodiment.

Figure 2:
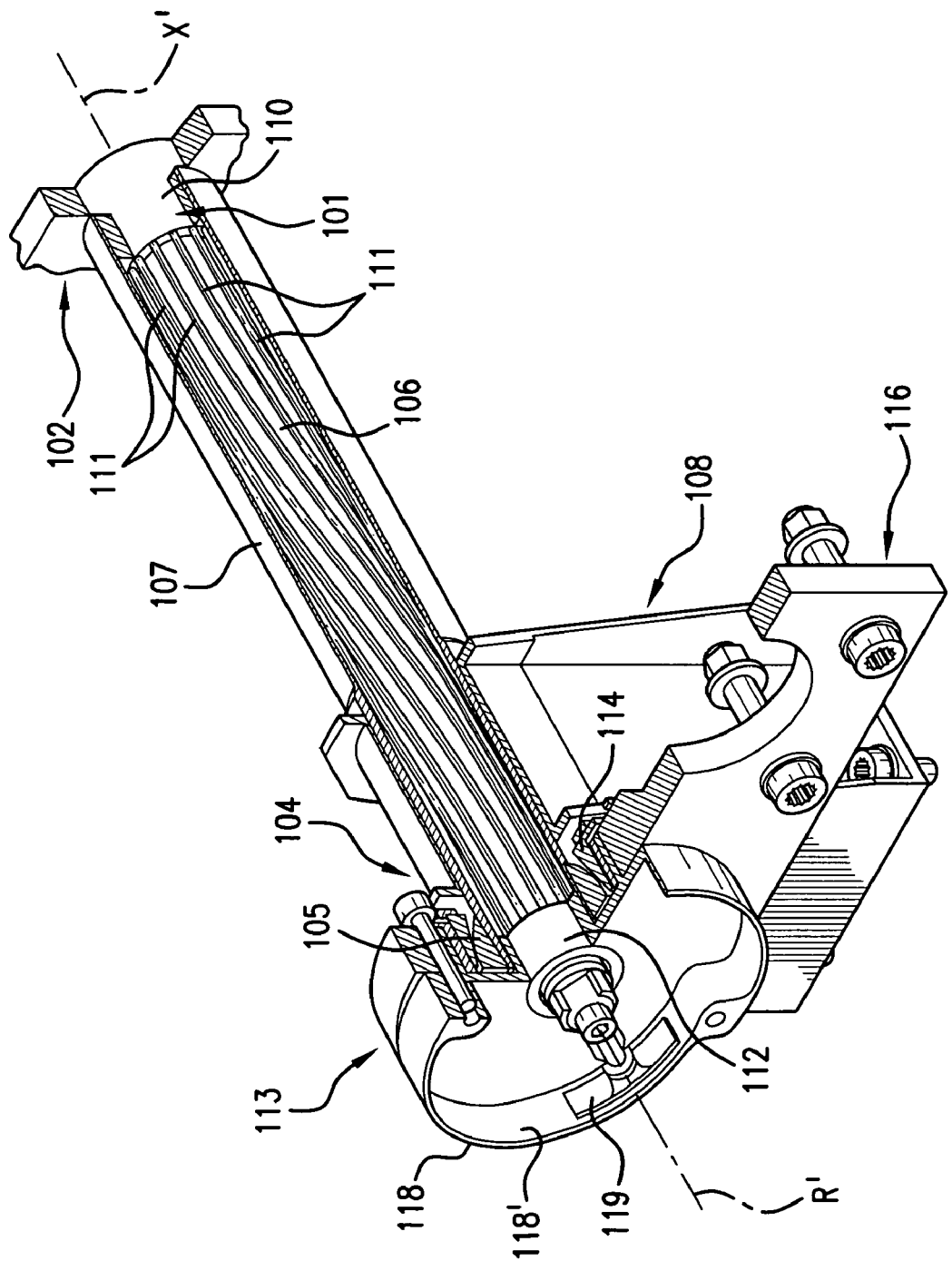
FIG. 2 is a perspective view, partially cut-away, showing a portion of a preferred embodiment of a mechanical rotational drive according to the invention.

FIG. 2 shows a practical embodiment of a particularly advantageous design of the mechanical rotational drive according to the invention. FIG. 2 shows the torsion element 101 and the counter-bearing device 104. The bearing device 102 in which the torsion element 101 is firmly clamped is shown only diagrammatically in FIG. 2.

The torsion element 101 shows a plurality of elastic flexural bars 111 arranged in an annular manner parallel to the longitudinal axis X', which bars are arranged at the same circumferential distance from one another and which are firmly connected to a first annular tube section 110, which is firmly clamped in the bearing device 102, and which are firmly connected at the free end of the torsion element 101 to a second annular tube section 112. As mentioned above, in a particular embodiment, the flexural bars can comprises a carbon fiber material. The torsion element 101 encloses a central support bar 106 that is likewise firmly connected to the second bearing device 102. The central support bar 106 penetrates the torsion element 101 in the direction of the longitudinal axis X'. The second annular tube section 112 of the torsion element 101 is rotatable relative to the central support bar 106 and can be supported thereon by way of a conventional friction bearing or roller bearing.

The torsion element 101 embodied in an annular or tubular manner is enclosed by a tubular jacket 107 that protects against outside influences at least in the area of the flexural bars 111 of the torsion element 101. In the example shown, the tubular jacket 107 is likewise firmly connected to the bearing device 102. The tubular jacket 107 is firmly connected to a bearing bracket 108 in the area of the free end of the torsion element 101. The bearing bracket 108 is penetrated by the torsion element 101, so that the free end of the torsion element 101 is located on the side of the bearing bracket 108 facing away from the bearing device 102.

The torsion element 101 is provided on its free end with a braking and damping device 113 and with a device 116 for transmitting a torque into the torsion element 101 or out of the torsion element 101.

The braking and damping device 113 comprises on the one hand the damping part 114 and on the other hand a brake drum 118 that is provided on the free front side of the torsion element 101 and extends away from the bearing device 102. The brake drum 118 is provided in an area that corresponds approximately to a rotation of 180° with a brake surface 118' arranged coaxially to the rotation axis R'. A brake shoe 119 projecting from the free end of the central support bar 106 is in slight frictional engagement with the brake surface 118' and damps with the tightening or relaxing the torsion element 101 rotational oscillations possibly occurring over the entire torsion area, even when the damping part 114 on the free end of the torsion element 101 and the damping device 105 of the counter-bearing device 104 are not engaged with one another.

The design and mode of operation of the braking and damping device 113 and the damping device 105 are described below on the basis of FIG. 3.

The braking and damping device 113 has an annular support body 120 that encloses the annular tube section 112 on the free end of the torsion element 101 and is connected thereto in a rotationally locked and axially locked manner.

The brake drum 118 is arranged on its free front side facing away from the bearing device 102. On the side facing the bearing device 102, the annular support body 120 is provided with an axially parallel annular rib 122 that extends in the direction of the bearing device 102. A thread section 124 with a thread 124' is embodied on the radially inner side of the annular rib 122. A thread 114' of the damping part 114 embodied in an annular manner is screwed into the thread 124'. The thread connection 114', 124' is thereby used for the fine adjustment of the position of the damping part 114 in the direction of the longitudinal axis X' of the torsion element 101. The damping part 114 has a radial flange 114" that contains bores through which locking screws and mounting screws 121 are guided, which screws penetrate the annular support body 120 radially outside the annular rib 122 and are screwed into the brake drum 118. In this manner the brake drum 118, the annular support body 120 and the damping part 114 are braced against one another in the axial direction and secured in the radial direction against relative twisting.

The tubular jacket 107 connected to the bearing bracket 108 has on its free end the damping device 105. The damping device 105 thereby extends outwards in the radial direction over the circumference of the tubular jacket 107 and there forms a spherically formed opposing friction surface 117 that interacts with the radially inner conical friction surface 115 of the damping part 114, which friction surface widens towards the annular support body 120 in the manner of a truncated cone. As mentioned above, a particular advantageous embodiment of the mechanical rotational drive according to the invention is wherein the damping part, such as damping part 14 or 114, has at least one friction surface, such as surface 15 or 115, that is rotatable around the rotation axis and that the damping device has at least one opposing friction surface, such as surface 17 or 117, that is arranged at least in sections around the rotation axis. Further, as also mentioned above, according to a particularly advantageous embodiment the friction surfaces, such as surface 15 or 115 as well as surface 17 or 117, are embodied as radial surfaces with respect to the rotation axis. Further, the friction surfaces can be embodied in an annular or partially annular manner.

A radial gap 123 is embodied between the damping part 114 and the front end of the tubular jacket 107 provided with the damping device 105, the width of which gap measured in the direction of the axis X' is at least slightly greater than the axial change of length ΔL of the torsion element 101 between its relaxed position and its tensioned position.

Figure 3:
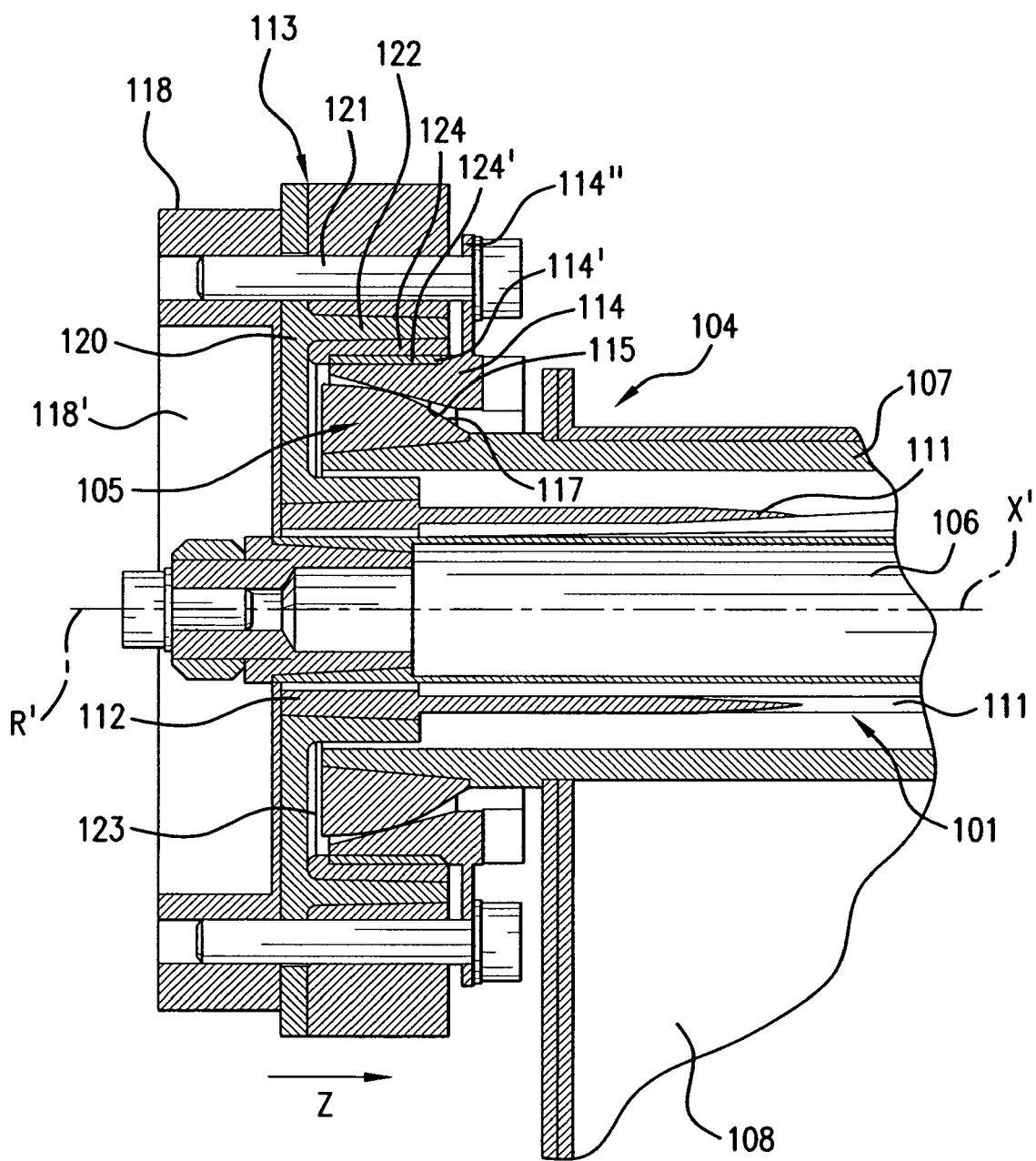
FIG. 3 is a vertical section of a damping system of the embodiment according to FIG. 2.

FIG. 3 shows the relaxed position of the torsion element 101 in which the friction surface 115 is in friction engagement with the opposing friction surface 117. If the torsion element 101 is rotated out of the relaxed position shown into its tensioned position, the braking and damping device 113 firmly connected to the torsion element 101 moves to the right relative to the counter-bearing device 104, formed by the bearing bracket 108, the end section of the tubular jacket 107 and the damping device 105, in the direction of the bearing device 102, as shown by the arrow Z in FIG. 3. With this displacement to the right, the friction surface 115 and the opposing friction surface 117 come out of engagement and conversely they do not come into engagement with one another again until the torsion element 101 is about to reach its relaxed position, so that the rotational movement of the torsion element 101 and the device 116 for transmitting torques connected thereto reach with positional accuracy the predetermined final position that determines the target position, and neither swing beyond this final position nor swing back out of this final position.

Figure 4:
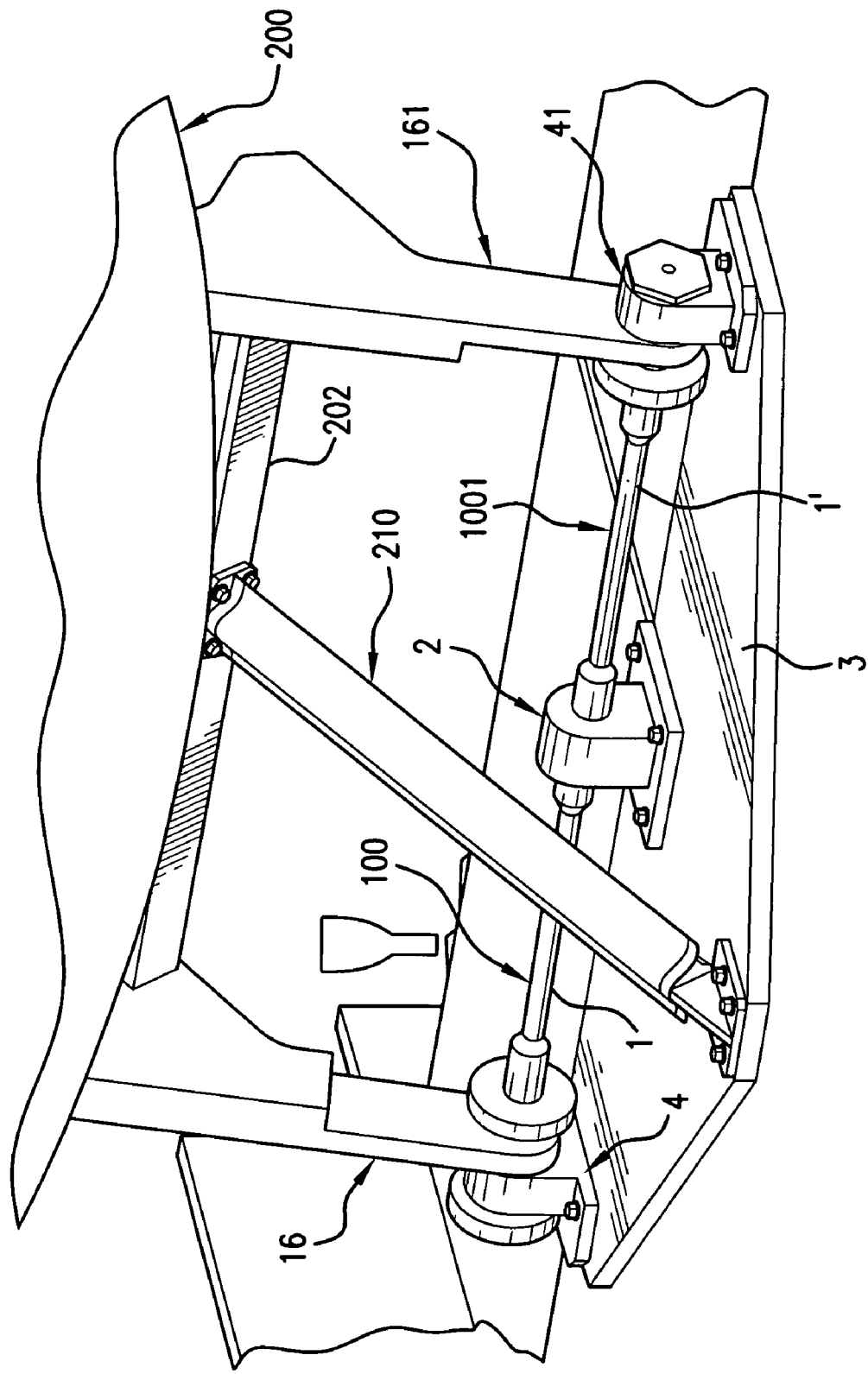
FIG. 4 illustrates an application of the mechanical rotational drive according to the invention on an antenna structure of a spacecraft.

FIG. 4 shows the application of a mechanical rotational drive according to the invention for extending an external structure on a satellite. On the base 3 that is provided on the outside of a satellite a first rotational drive 100 and a second rotational drive 100' are provided, which, although they are installed on a bearing device 2 firmly connected to the base in a mirror-image manner, are essentially structured identically.

Two lever arms 16, 16' serve respectively as a device for transmitting torque from the respective rotational drive 100, 100' to the structure of a satellite antenna 200 represented diagrammatically. The lever arms 16, 16' are thereby attached to the respective torsion element 1, 1' in a rotationally fixed manner and pivoted in respective counter-bearing devices 4, 4'.

In the deployed position of the satellite antenna 200, i.e., when the torsion elements 1, 1' are in their relaxed position, a folding diagonal tie 210 braces both tensile forces and compressive forces from the structure 202 of the satellite antenna 200 on the base 3. The diagonal tie 210 comprises two resilient panels, omega-shaped in cross section, that are connected to one another along their longitudinal edges. In this manner the diagonal tie can be folded up by applying a relatively great bending force, whereby the resilient panels rest against one another in the bending areas. In the extended condition shown in FIG. 4, in which the diagonal tie has a double-omega shape in cross section, however, due to the resilient properties of the two panels it has a high bending stability so that in this case with deployed antenna 200 it can brace without difficulty tensile forces and compressive forces that occur.

In the exemplary embodiment of the mechanical rotational drive according to the invention shown in FIG. 4, the deployment force of the diagonal tie 210 ensures that the braking and damping force between the respective damping part and the respective damping device already starting shortly before the target position, i.e., the final position of the torsion elements 1, 1', is reached, is overcome by the residual stretching force of the diagonal tie 210 so that it is reliably guaranteed that the satellite antenna 200 is erected by the time the target position is reached.

The invention is not limited to the particulars of the exemplary embodiment described above, which serves only to explain generally an embodiment of a basic feature of the invention. Within the scope of the patent the device according to the invention can rather also take on forms of embodiments other than those described above. The device can hereby have in particular features that represent a combination of the respective individual features of the claims which follow.

Reference numbers in the claims, the specification and the drawings are only to make the invention more intelligible and are not to limit the scope of the invention.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMERALS

1 Torsion element
2 Torsion element
3 Bearing device
4 Counter-bearing device
4' Counter-bearing device
5 Damping device
10 First end
12 Second free end
14 Damping part
15 Conical friction surface
16 Torque-transmitting device
16' Torque-transmitting device
17 Conical opposing friction surface
100 First rotational drive
100' Second rotational drive
101 Torsion element
102 Bearing device
104 Counter-bearing device
105 Damping device
106 Central support bar
107 Tubular jacket
108 Bearing bracket
110 Annular tube section
111 Elastic flexural bar
112 Annular tube section
113 Braking and damping device
114 Damping part
114' Thread
114" Radial flange
115 Friction surface
116 Torque-transmitting device
117 Opposing friction device
118 Brake drum
118' Braking area
119 Brake shoe
120 Annular support body
121 Locking and mounting screw
122 Annular rib
123 Radial gap
124 Thread section
124' Thread
200 Satellite antenna
202 Structure
210 Diagonal tie
R Rotational axis
R' Rotational axis
S Gap
X Longitudinal axis
X' Longitudinal axis
Z Arrow

The invention claimed is:

1. A mechanical rotational drive comprising:
a bar-like torsion element extending along a longitudinal axis of rotation, said bar-like torsion element having a first end and a second end;
a bearing device, the first end of said bar-like torsion element being clamped in said bearing device, the second end being a free end;
said torsion element being rotatable along said longitudinal axis of rotation whereby said second free end of the torsion element being rotatable relative to said first clamped end, between a tensioned position and a relaxed position;
a length of the torsion element in a tensioned position being reduced with respect to a length of the torsion element in the relaxed position;
a device for transmitting a torque to and from the torsion element positioned in an area of the free end of the torsion element;
a damping device is positioned in an axial direction of the torsion element at a fixed distance from the bearing device and adjacent to the free end of the torsion element; and
a damping part is provided on the torsion element in the area of the free end of the torsion element, said damping part in the relaxed position of the torsion element being in friction engagement with the damping device, said damping part in the tensioned positioned of the torsion element not being engaged with the damping device.

2. A mechanical rotational drive according to claim 1, wherein:
the torsion element comprises a central support bar.

3. A mechanical rotational drive according to claim 2, wherein:
the free end of said torsion element is freely rotatable relative to the central support bar.

4. A mechanical rotational drive according to claim 1, wherein:
the torsion element comprises elastic flexural bars annularly arranged parallel to the longitudinal axis.

5. A mechanical rotational drive according to claim 4, wherein:
said elastic flexural bars are made of a carbon fiber material.

6. A mechanical rotational drive according to claim 4, wherein:
the torsion element is annularly enclosed by a tubular jacket at least in the area of the flexural bars.

7. A mechanical rotational drive according to claim 6, wherein:
the free end of the torsion element is freely rotatable relative to the tubular jacket.

8. A mechanical rotational drive according to claim 1, wherein:
the damping part has at least one friction surface that is rotatable around the longitudinal axis of rotation; and
the damping device has at least one opposing friction surface arranged at least in sections around the longitudinal axis of rotation.

9. A mechanical rotational drive according to claim 8, wherein:
the at least one friction surface and the at least one opposing friction surface are embodied as radial surfaces relative to the longitudinal axis of rotation.

10. A mechanical rotational drive according to claim 8, wherein:
the at least one friction surface and the at least one opposing friction surface are embodied as conical surfaces around the longitudinal axis of rotation.

11. A mechanical rotational drive according to claim 8, wherein:
the at least one friction surface and/or the at least one opposing friction surface are embodied in an annular or partially annular manner.

12. A spacecraft assembly comprising:
an external structure adapted to be deployed on a spacecraft;
a mechanical rotational drive for deploying said external structure, said drive comprising:
a bar-like torsion element extending along a longitudinal axis of rotation, said bar-like torsion element having a first end and a second end;
a bearing device, the first end of said bar-like torsion element being clamped in said bearing device, the second end being a free end;
said torsion element being rotatable along said longitudinal axis of rotation whereby said second free end of the torsion element being rotatable relative to said first damped end, between a tensioned position and a relaxed position;
a length of the torsion element in a tensioned position being reduced with respect to a length of the torsion element in the relaxed position;
a device for transmitting a torque to and from the torsion element positioned in an area of the free end of the torsion element;
a damping device is positioned in an axial direction of the torsion element at a fixed distance from the bearing device and adjacent to the free end of the torsion element; and
a damping part is provided on the torsion element in the area of the free end of the torsion element, said damping part in the relaxed position of the torsion element being in friction engagement with the damping device, said damping part in the tensioned positioned of the torsion element not being engaged with the damping device.

* * * * *